Oct. 23, 1956  A. GRUMET ET AL  2,768,348
ELECTRIC TIME DELAY MEASURING DEVICES
Filed Sept. 3, 1954  11 Sheets-Sheet 1

INVENTORS
ALEX GRUMET
JOHN P. CALLAHAN

BY
ATTORNEY

Oct. 23, 1956   A. GRUMET ET AL   2,768,348
ELECTRIC TIME DELAY MEASURING DEVICES
Filed Sept. 3, 1954   11 Sheets-Sheet 9

INVENTORS
ALEX GRUMET
JOHN P. CALLAHAN

BY
ATTORNEY

Oct. 23, 1956    A. GRUMET ET AL    2,768,348
ELECTRIC TIME DELAY MEASURING DEVICES
Filed Sept. 3, 1954    11 Sheets-Sheet 10

INVENTORS
ALEX GRUMET
JOHN P. CALLAHAN

BY
ATTORNEY

United States Patent Office 2,768,348
Patented Oct. 23, 1956

2,768,348

ELECTRIC TIME DELAY MEASURING DEVICES

Alex Grumet, New York, and John P. Callahan, Mount Vernon, N. Y., assignors to EDO Corporation, College Point, N. Y., a corporation of New York Application September 3, 1954, Serial No. 454,032
Serial No. 454,032

9 Claims. (Cl. 324—68)

This invention relates to improvements in electric time delay measuring devices in general, which improvements have particular application to loran receivers of the direct reading type.

Loran is an electronic system providing means to determine geographic location. The system comprises a plurality of pairs of transmitting stations, the stations of each pair being separated from each other by known distances. One station of the pair, designated as the master station, emits pulses (to be called A pulses) at a predetermined rate. The other station of the pair, called the slave station, also emits pulses (to be referred to as B pulses), but each pulse of the slave station is made to follow a master station pulse A, by a fixed interval, calculated in millionths of a second, or microseconds. The interval, also in microseconds, between the receipt at a receiving station, disposed apart from both the master and slave stations, of each pulse A from the master station and of the synchronized pulse B which the former causes the slave station to emit, provides intelligence as to the line (or curve) of possible location of the receiving station relative to the two transmitting stations. Measuring the similar time interval between receipt of master and slave pulses of a second pair of transmitting stations, gives the receiving station operator a second line. The intersection of the two lines of possible location provides a navigational fix. Charts of lines of designation of measured time intervals from various pairs of stations have been prepared by official agencies such as the U. S. Hydrographic Office and are available to navigators.

It is an object of the present invention to provide a receiver in which this time interval may be determined quickly and accurately and then may be read directly from a board or panel.

It is also an object to provide apparatus having minimum circuitry which can perform the plurality of functions required in the several steps involved in bringing in selected pairs of stations and measuring the critical time intervals.

It is a further object to provide receiving and measuring equipment of such circuitry and components as will be least likely to get out of adjustment and hence provide inaccurate intelligence.

The present invention employs a counter series of three special multiple element tubes (designated as Burroughs MO-10's) followed by two flip-flop stages, all of which series serve first as a frequency subdivider, in conjunction with certain switching means, to produce pulses in synchronism with the repetition rate of a selected pair of stations, the time interval between receipt of signals from which stations is to be measured. The switching means are so connected to the series of MO-10's) and flip-flops as to permit the selection of the full gamut of possible pulse repetition rates of all known loran stations. Once the repetition rate of the desired signals is matched, the output pulse of the said counter series is employed first to trigger a slow sweep generator. The output of the latter is placed on a double "A" scan cathode ray tube to provide two sweep lines one above the other. This is accomplished by continuously recycling the counter series with each output pulse. Within the time interval between the station repeated pulses, and hence each recycling, by means of a second set of switches, the MO-10 units of the counter series are adjusted with reference to "A" scan presentations to match the time difference between the receipt of the master and slave signals. These switches carry numerical designations corresponding to counts for each decimal point of time in microseconds measured by the stage of the counter series which each switch controls. Time difference may, therefore, be read directly from the switch designators.

The invention is further detailed and explained with reference to the annexed drawings, in which:

Figure 13 is a diagram of the coincidence of the 10, 100 and 1,000 microsecond pulses in our novel loran receiver;

Figure 2:
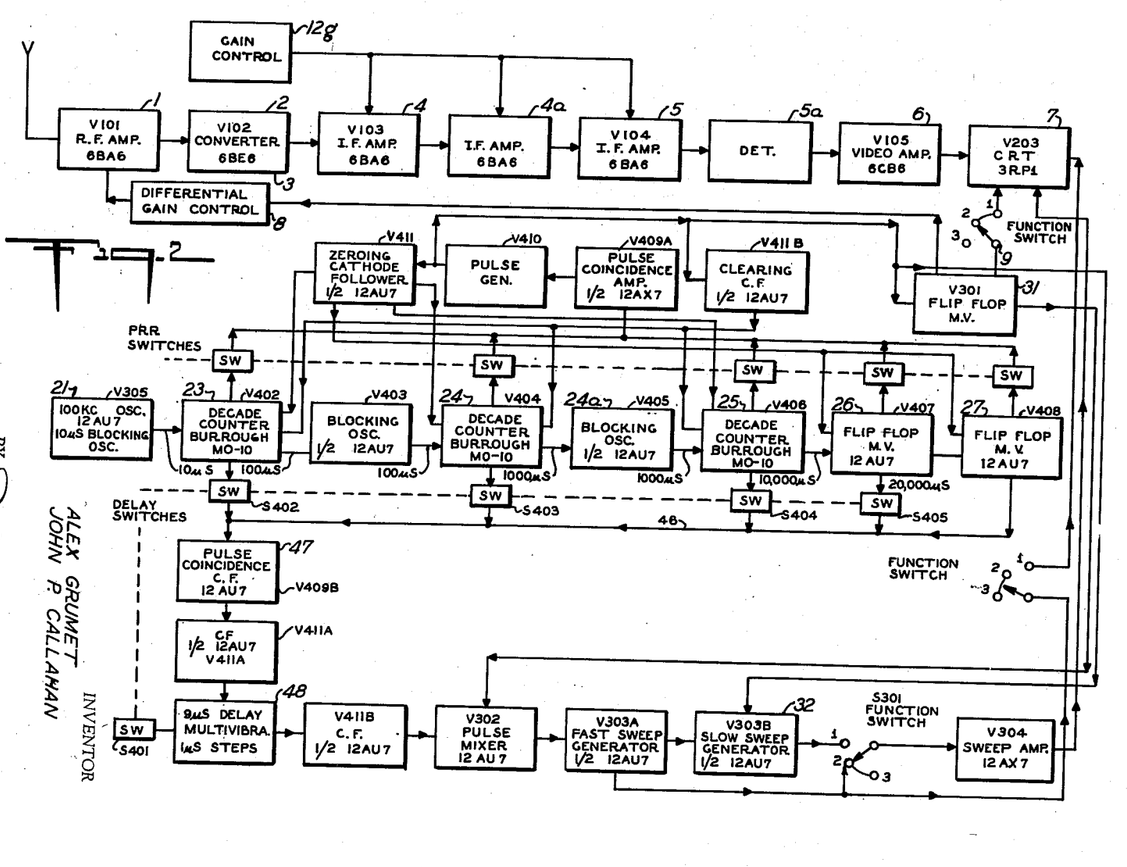
Figure 2 is a block diagram of the receiver.

Referring first to Figure 2, in our preferred embodiment the receiver is a superheterodyne operating in the two megacycle region with an intermediate frequency of 455 kc. Thus, we provide one stage 1 of radio frequency amplification followed by pentagrid converter 2 which also functions as a local oscillator 3 providing the signal to be mixed with the received radio frequency signal. The resulting intermediate frequency pulses are then amplified by three stages 4, 4a, 5, which also provide the required band pass characteristics detected for video by a crystal diode 5a; the video amplified at 6, and applied to the vertical deflection plates of cathode ray tube 7.

Tuning to one of the four loran frequencies of 1950 kc., 1850 kc., 1900 kc. or 1750 kc. is accomplished by means of panel knob 11 on the left side of the receiver (Figure 1), which throws a channel selector switch (not shown). The latter tunes an antenna transformer (not shown), the radio frequency amplifier plate circuit 1, and the local oscillator 2 in the pentagrid converter 3.

Panel knob 12 operates a master gain control 12g which acts to vary the gain of the three intermediate frequency amplifier stages 4, 4a, 5, thereby to permit adjustment of the amplitude of the received impulses on the cathode ray tube.

A differential gain control 8, which adjusts the gain of the radio frequency amplifier so that both master and slave pulses may appear equal in amplitude on the cathode ray tube 7, is operated by panel knob 13.

Function switch S-301, operated by knob 14, places the several circuit elements into different operational hook-ups for the separate procedural steps involved in the set operation.

The manner in which receiver thus far functions and the circuitry required therefore are readily understood by persons skilled in the loran and video receiver art, and hence need be not further detailed in this application. Such details form no part of our present invention.

Considering next the clocking and measuring components and circuitry, we provide a 100 kilocycle (100 kc.) crystal oscillator controlled blocking oscillator 21 which develops negative pulses at a repetition rate of 10 microseconds. Schematic diagram of this oscillator is shown in Figure 6. These pulses are delivered by connection 16 (Figure 3), into the first of the series of counters 23, 24, 25, 26, 27. Counters 23, 24 and 25 are each comprised of one of the recently developed Burroughs MO-10 beam switching type tubes with supporting circuitry shown in Figures 3, 4 and 5, all as more fully explained hereinafter. The MO-10 is described generally in the January 1954 issue of "Electronic Design," and is also the subject of privately printed publications of the Burroughs Electronic Instruments Division, Philadelphia, Pennsylvania. Briefly, this MO-10 tube contains a common cathode (designated by reference character 101 in Figure 12a), radially surrounded by ten "spades" (102–111) separated equidistantly from each other. Disposed even further radially outwardly and separated from the "spades" is an array of ten plates or targets 112–121. These targets are also separated equidistantly from each other. Between each "spade" and one of the adjacent targets is a control grid 122–131. The entire arrangement is enclosed within a single glass envelope 132 about which is cemented a cylindrical permanent magnet 133.

The Burroughs Beam Switching MO-10 tube utilizes the magnetron principle of an electron stream reacting with crossed electric and magnetic fields. There are eleven stable states of operation, one cleared condition when no outputs are available and ten stable output positions. The axial magnetic field is supplied by means of a cylindrical permanent magnet mounted around the tube.

Figures 12A, 12B, 12C:
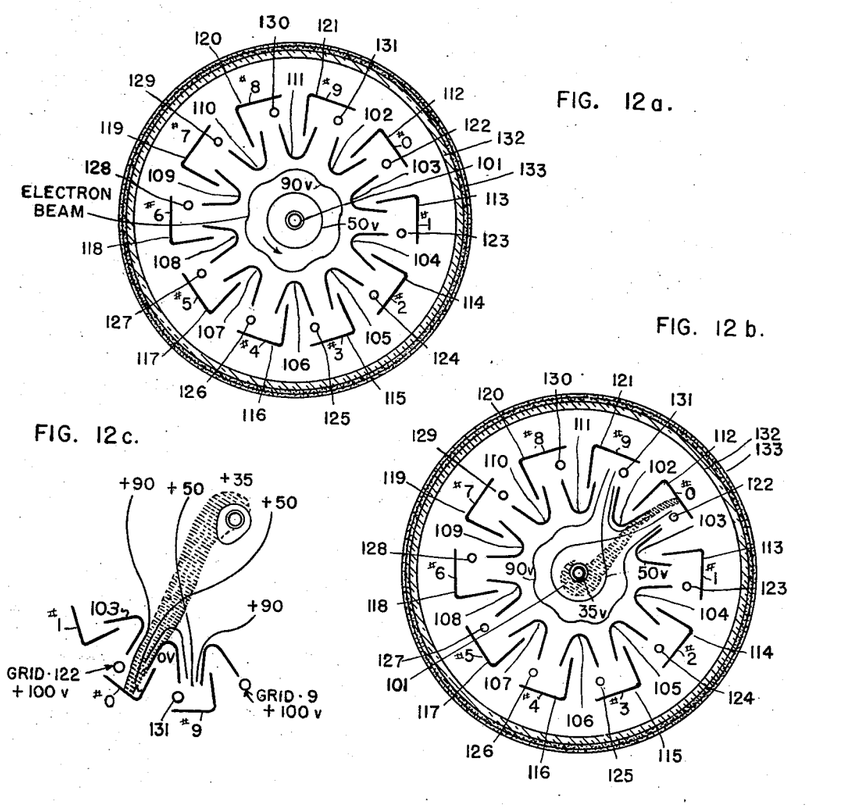
Figure 12a is a radial section in somewhat schematic form of an MO-10 beam switching type tube in cleared condition.
Figure 12b is a similar view to Figure 12a, but in this view the beam is shown as formed on the zero target electrode.
Figure 12c is a partial magnified view of a portion of the section view of Figure 12a, showing the beam condition before switching action starts.

The tube configuration is shown in Figure 12a with the tube in the cleared state.

The primary electric field is established by the spade electrodes. In Figure 12a, all spades would have a positive potential of 100 volts, with respect to the cathode and a radial electric field is established that is approximately circular in shape. The resultant force on the electron beam of the radial electric field and the axial magnetic field causes the electrons to rotate in a counter-clockwise direction about the cathode and the beam is never able to contact any of the electrodes. The tube is in the cut-off or cleared condition. In this condition the potentials of the grid and target electrodes have no effect upon this operation of the tube.

The tube is placed in the operating condition by lowering the potential of one of the spades (e. g. spade 102), to near cathode potential, i. e. zero volts. A crossed electric field is set up and the electron stream is now able to reach the target and spade electrodes 112, 102 respectively, as shown in Figure 12b.

If a high resistance (100,000 ohms) (R-447—R-456, Figs. 3, 4, 5), is placed in series with each of the spade electrodes, the current drawn by any spade will hold its potential at a sufficiently low value to maintain the crossed electric field and prevent interruption of the electron stream. This is a stable state.

The configuration of the spade and target electrodes is such that when the beam is formed as shown in Fig. 12b, most of the current is directed to the target electrode 112, the ratio of target to spade current being approximately 5 to 1. The configuration of the electric field about the target electrode is such that the target electrode has a more or less constant current characteristic and operation of the tube is more or less independent of target loading.

The beam may be switched to the next position (position #1), by any means that will lower the spade potential of that position. As the electric field about spade 103 decreases, the beam moves in a clockwise direction toward it. In so doing, the beam draws away from spade 102, decreasing its current and allowing its potential to rise. The increased field on the left side of the beam causes it to shift still further toward the #1 position, and a regenerative process is set up that causes the switching action to take place at high speeds. The beam will again lock in on position #1, in a stable manner. It should be noted that while the rotation of the electron stream in the tube is counter-clockwise, the switching action of the tube occurs in a clockwise direction.

It is possible to shift the beam as many as five positions in a clockwise direction from the conducting spade merely by lowering the potential on that particular spade. But it is never possible to shift the beam in a counterclockwise direction due to the configuration of the crossed electric field.

In order to facilitate the triggering of the tube, switching grids 122—131 have been provided. The grids are located in such a position that they draw little current from the electron stream and accomplish their switching action by distorting the electric field, as shown in Fig. 12c. The switching grids are normally held at a positive potential and cause switching when reduced to cathode potential (or below for high speed switching). The limited effect of the grid is such that it is incapable of causing switching beyond the first clockwise section of the tube.

Figure 12D:
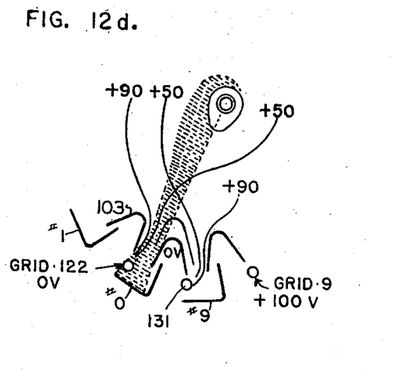
Figure 12d is a view similar to Figure 12c, showing the condition after switching action is initiated.

When the potential of the switching grid 122 on the next clockwise position is lowered, the electric field about the grid and its spade is slightly distorted, causing the beam to move clockwise towards them (Fig. 12d). The number one spade starts to draw current, its potential drops, and the regenerative switching action sets in.

If the potentials on the switching grids are set too low, switching automatically occurs and the tube runs free at a rate governed by the electrode voltages and the spade resistors. For satisfactory operation the grids should normally be maintained at a positive potential of thirty (30) volts relative to the cathode, and when keying occurs, grid potential is dropped to a negative value of forty (40) volts relative to the cathode.

In the type MO-10 tube alternate switching grids 122—131 are tied together internally so that only two leads are brought out of the tube. Switching may be accomplished by means of a multivibrator in which the switching grids are directly coupled to the multivibrator plates. In this way switching is completely independent of pulse length since when one grid goes negative, its adjacent grid goes positive and the Burroughs tube may only index one position at a time.

An alternate method of switching, which method we prefer and have employed in our apparatus, is to connect all the grids in parallel and pulse them negative with a very short pulse. In this case the pulse length must be short enough so that the tube will not index more than one position during the period that the grid is negative. In this condition, the tube is free running whenever the grids go negative. For normal potentials on the electrodes, stable triggering will result if pulse width (at the negative forty volt grid potential) falls within the range of 0.2 to 0.5 microsecond.

The values of the plate or target resistors R-419—R-428 are not particularly critical. In our preferred embodiment we have employed with satisfactory results resistors of 6,800 ohms, but other values between 2,000 and 20,000 would probably work.

The operation of the Burroughs type MO-10 is somewhat similar to that of ten beam forming tetrodes. Operation is initiated by the switching or control grid. The operating characteristics are set by the potential on the spades or screen grids. The target or plate electrode exhibits constant current characteristics and loading of this electrode has little effect upon the operation of the tube.

While in the MO-10 type tube alternate grids are tied together and brought out of the envelope by means of two separate leads 134, 135, in our preferred arrangement all control grids 122—131 are tied together and the series of pulses from the blocking oscillator 21 serve to trigger the control grids at ten microsecond intervals. The result is that the beam moves around step by step from target to target in a regular course with each pulse from the oscillator. It will be seen, then, that pulses will appear at target 121 each time ten pulses arrive at the control grids 122—131. In this manner the MO-10 tube can be employed as a decimal counter, or a frequency subdivider. At target 121, therefore, pulses occur at a repetition rate of one each 100 microseconds (Fig. 8a).

Figure 8:
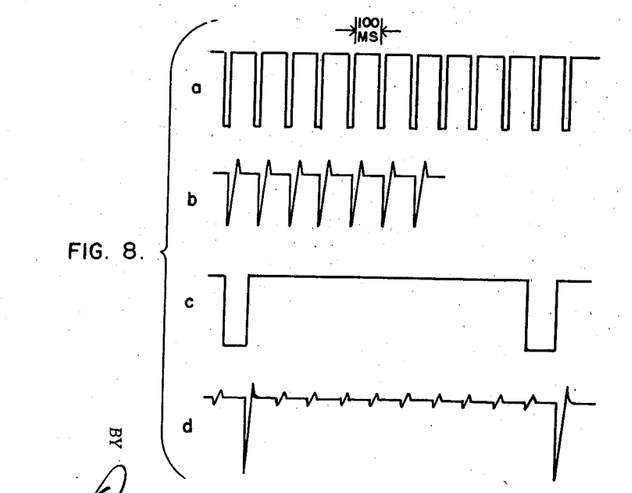
Figure 8 is a graphic presentation of waveforms during time intervals which are referred to herein in the explanation of our invention.

We now connect target 121 to a blocking oscillator V-403, the purpose of which is to sharpen the output pulses at that target and which appear as shown in Fig. 8a, to the form as shown in Fig. 8b.

Figure 3:
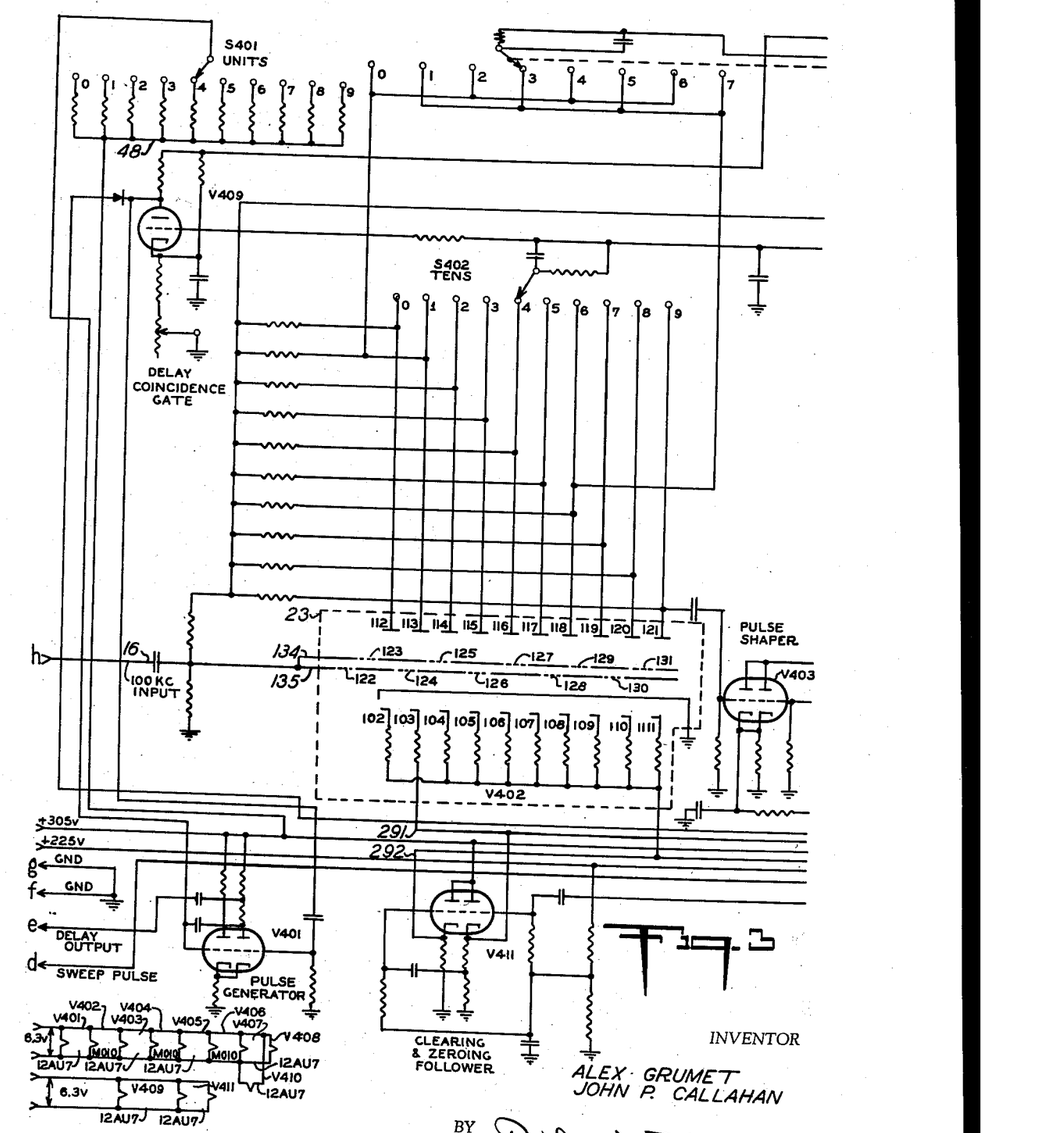
Figures 3, 4 and 5, to be placed side by side in that order from left to right, comprise the schematic circuit diagram of the counter series, recycling stage, and certain associated components of the preferred embodiment of our invention.
Figure 4:
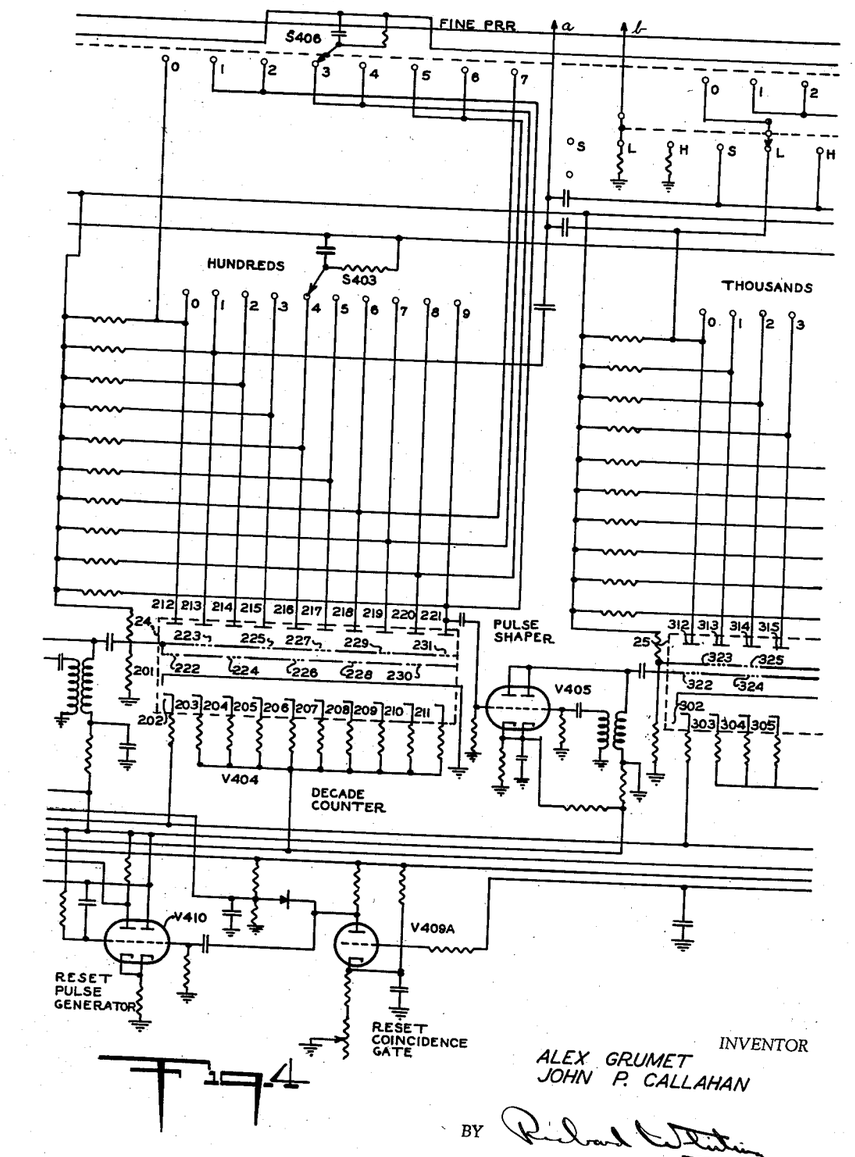
Figure 5:
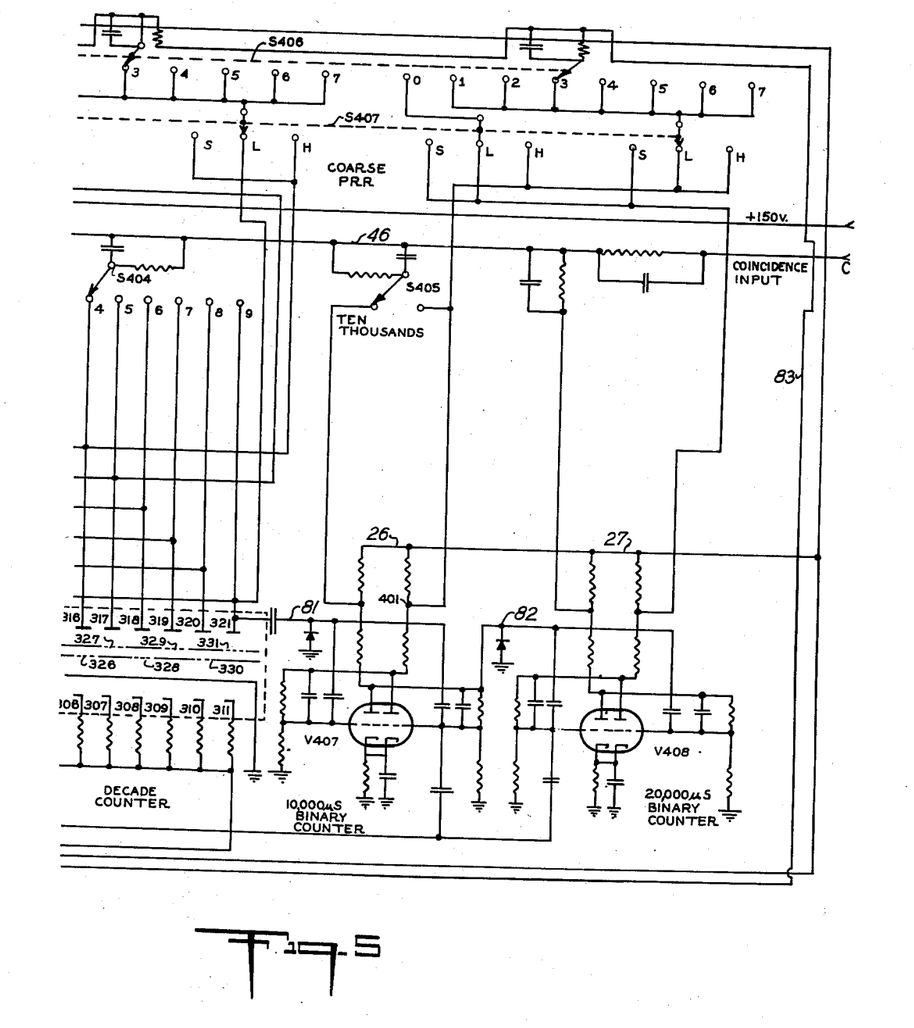
Figure 6:
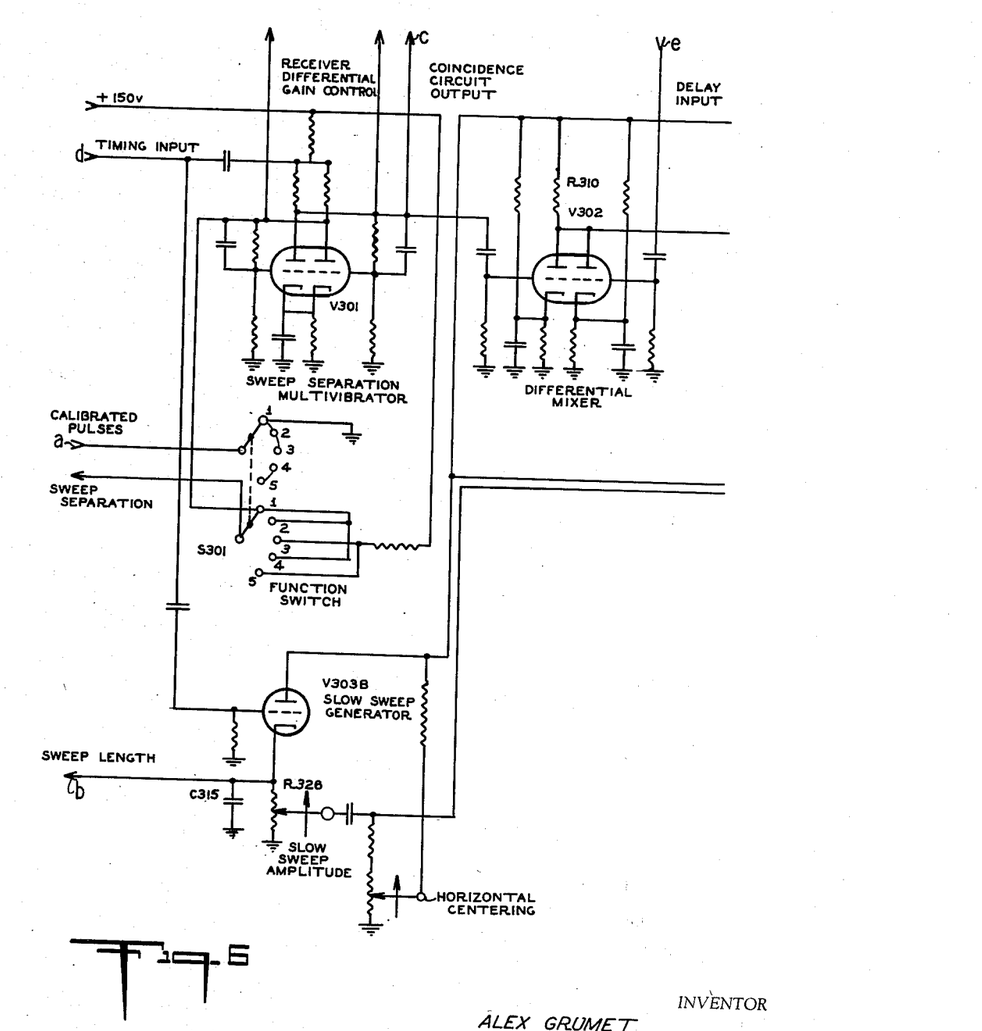
Figures 6 and 7, also to be placed side by side, are a schematic diagram of the oscillator, sweeps, and certain associated circuits of the preferred embodiment of our invention.

The output of this blocking oscillator V-403 is then fed to the control grids of a second MO-10, wired as shown in Figs. 3, 4, 5, and functioning as a decimal counter or frequency subdivider 24 in the same manner as the first MO-10. This drops the pulse repetition rate at target 221 to 1000 microseconds (Fig. 8c). A further blocking oscillator V-405 takes the pulse shape of Fig. 8c on target 221 and sharpens it to the form of Fig. 8d. Again the output pulse from blocking oscillator V-405 is put through a third MO-10 (25) in a similar manner to further reduce the pulse repetition rate to 10,000 microseconds. The output of the third MO-10 is fed to the binary counter stages 26, 27 via leads 81, 82. These stages 26, 27 are conventional flip-flops, each serving to further halve the pulse repetition rate.

It is observed from the schematic diagrams of Figs. 3, 4 and 5 that each of the counter tubes 23—27 has an output point for each of its count positions, i. e., each decade has ten output points; each binary, two. The desired outputs are selected by the coarse and fine repetition rate switches S-407, S-406, respectively, to give the proper repetition rate for the selected station. For example, if the switches are to select station L7 with a half repetition interval of 19,650 microseconds, S-407 will tap output point 401 of the first binary counter 26; target 321 of the third decade counter 25; target 218 of the second decade counter 24; and target 118 of the first decade counter 23.

Figure 14A:
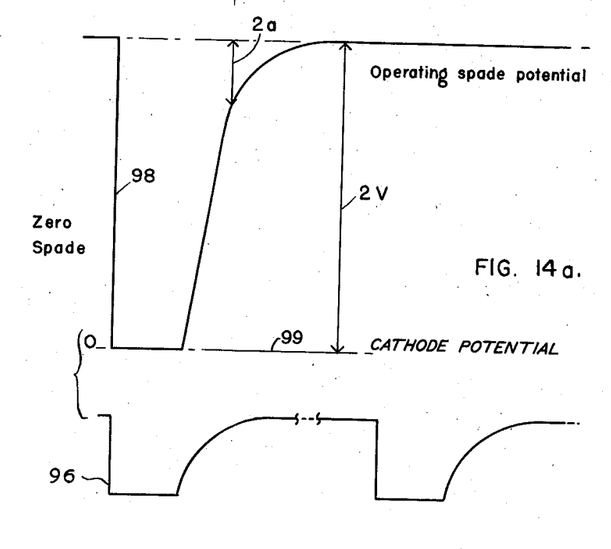
Figure 14a is a representation of the pulse shape and amplitude of cathode follower V-410A to which reference is hereinafter made.
Figure 14B:
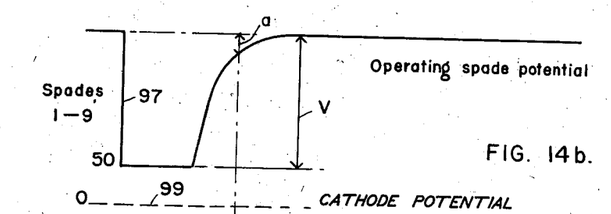
Figure 14b is a representation of the pulse shape of a companion cathode follower V-410B.
Figure 15:
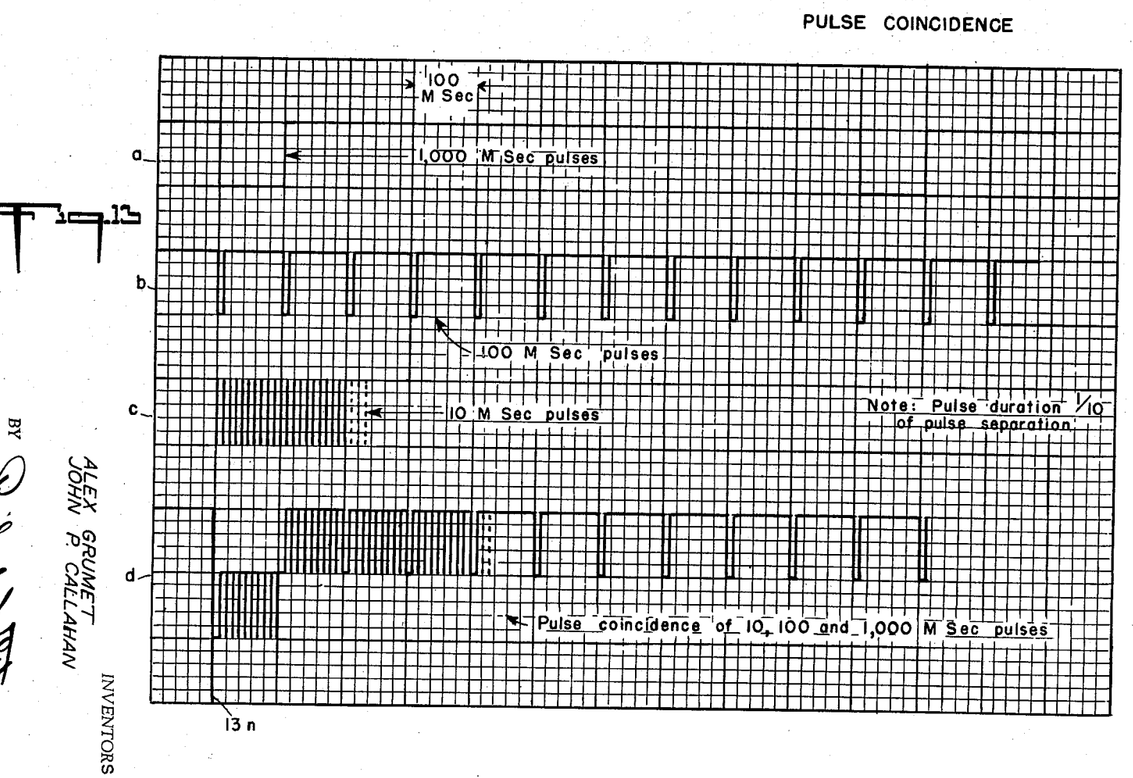

To effect proper recycling (i. e. clearing and resetting of the counters 23—27), we combine the pulses selected by the repetition rate switches (Fig. 13), from the several components of the counter series, and apply their resultant wave form, via lead 83, to clipper amplifier V-409A, and only the most negative portion 13n of each of the wave shapes of Fig. 13d is passed to the plate of that tube as a positive pulse. These positive pulses trigger a twin-triode reset pulse generator V-410 which is a two microsecond one-shot multivibrator. The negative two microsecond pulse 96′ in Figs. 14a and 14b from this generator V-410 is then fed to the grids of the twin triode cathode followers V-411 wired in tandem. The output of the right hand cathode follower in V-411, with a large pulse amplitude (Fig. 14a), is delivered by bus 291 to the zero spades of the MO-10 tubes 24, 25, and the number one spade of tube 23, while the output of the left hand cathode follower V-411, of smaller amplitude (Fig. 14b), is passed by bus 292 to the 1-9 spades of each MO-10 tube, 24, 25, and 0.2-9 spades of MO-10 tube 23.

To recycle the MO-10 counters each must first be cleared by momentarily reducing all of its spade potentials to a value relatively close to that of its cathode, after which the potentials of all of the spades are raised back to their normal positive value. In this last mentioned state, none of the ten targets will draw current or have control so that each tube is effectively cleared. Counting is then initiated by "zeroing" each tube, i. e., lowering the voltage of the zero spade so as to cause a current flow to the zero target. Such condition will maintain so long as the zero spade is held externally at a low potential. When this low voltage potential on the zero spade is removed, the MO-10 will index or count in accordance with the triggering voltage applied to the grids. We accomplish both clearing and zeroing by triggering (pulse 96′) the two cathode followers of V-411 to provide, as explained above, simultaneously two negative pulses 97, 98 (Figs. 14a and 14b), which are similarly shaped but of different amplitude. Pulse 97, somewhat above 0 cathode potential (line 99) in value, is applied to spades 1-9 of each MO-10, while pulse 98, which dips to just about 0 cathode potential 99, or even slightly lower, is applied to the zeroing spades. If the positive time constants or exponential curves are similar for both pulses 97, 98, it will readily be perceived that the voltage on the zero spade will return to its normal positive potential slightly later (of the order 0.2 to 0.5 of a microsecond), than the voltage on spades 1-9. Such condition is exactly what is desired to effect both clearing and then zeroing of the MO-10's.

The output reset pulses are also utilized, via pulse coincidence pulse amplifier and generator V-410, (Fig. 2), to trigger the slow sweep generator 32. The latter, in the first position of function switch S-301, applies a sweep voltage to the horizontal deflection plates of the CRT7. Synchronization of the sweep with the recycling is assured by connecting the sweep circuit to the left hand plate of the reset pulse generator V-410, which is triggered by the reset coincidence gate V-409A. As previously stated the latter responds only to the most negative portion of the coincidence pulses of Fig. 13. The dual sweep binary V-301, is also triggered by the output pulse of V-410, and the output of V-301, in turn, in the first position of function switch S-301, is applied to the vertical plates of the CRT. In this way there is developed on CRT7 a dual trace with a repetition rate coinciding with that of the desired station.

Figure 7:
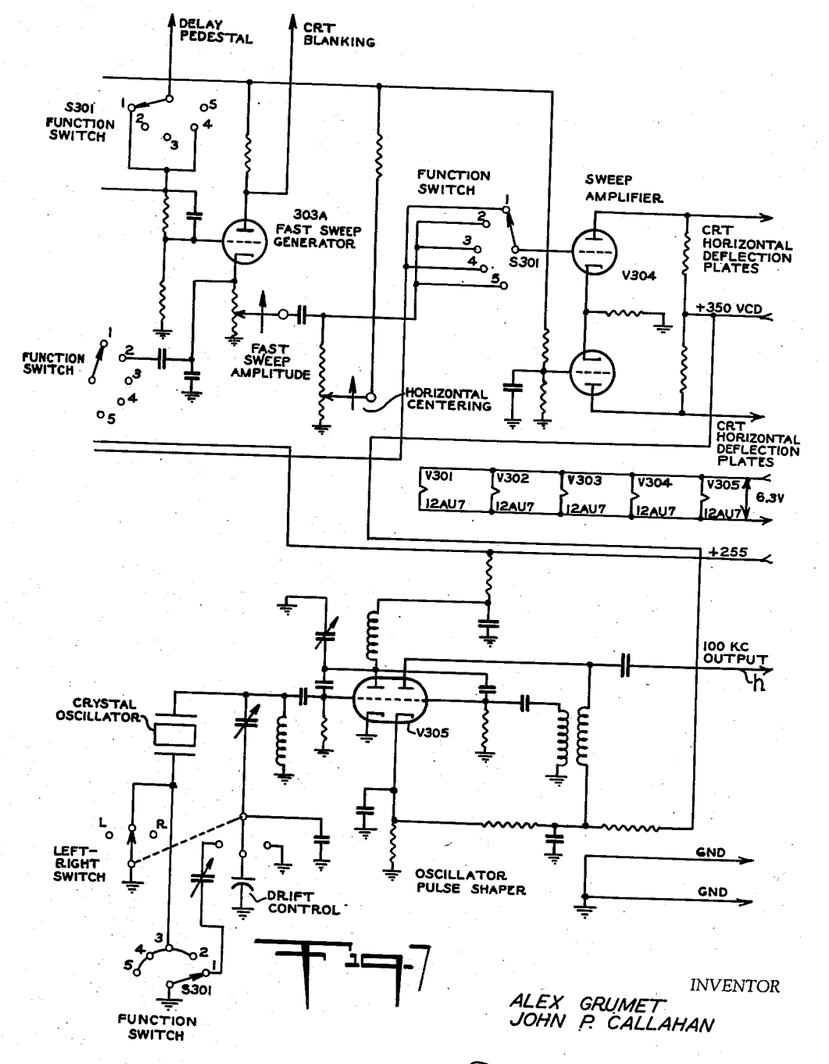

To assure that the reader of this specification will visualize the proper continuity of the leads to and from the various portions of the circuits of Figs. 3, 4 and 5 with the portion of the circuits of Figs. 6 and 7, we have employed about the border of Figs. 3, 4 and 5 for certain leads reference letters a through h. These leads are to be mated with leads bearing corresponding letters found about the borders of Figs. 6 and 7. For example, on Fig. 3 at the lower left hand corner will be found the letter d at the tip of the arrow on the line label "Sweep pulse." Passing to Fig. 6, a letter d will be found on the upper left hand border. This means that the leads of Figs. 3 and 6 thus similarly bearing the letter d are connected to each other. With respect to the other undesignated leads, these extend to such common and well understood components, as the power supply and receiver which we have not considered necessary, to detail by circuit diagrams.

The counter series 23—27 serve not only to match the desired station pulse repetition rate, but also to determine the time delay in microseconds between the receipt of the master and slave pulses. Since the maximum delay encountered is always less than half the pulse repetition interval, the time delay between receipt of master and slave pulses is measured directly by a second coincidence circuit on the frequency divider chain.

A second coincidence circuit is provided to ascertain the delay required to coalign the received master and slave pulses, as follows: Each MO-10 decade counter 23, 24, 25 is provided with ten leads from its target elements to a series of contact positions on a separate delay selector switch S-402, S-403, S-404. The output of binary 26 is also determined by the selection made by dual position switch S-405. The outputs of these selector switches S-402—S-405 are all combined by bus connection 46 and conducted to coincidence circuit 47 (Fig. 2). The manner in which the 10, 100 and 1000 microsecond pulses are coincided is illustrated in Fig. 13. The output of the dual sweep binary 27 is also inserted in the coincidence circuit 47 so that an output pulse from the latter will occur only on the lower of the two slow sweep traces on the CRT7. The operation of the delay switches S-402—S-404 is exactly the same as that of a decade resistance box. With the foregoing selector switch arrangement, any delay from 0 to 20,000 microseconds in steps of 10 microseconds may be selected. The coincidence pulse is then fed into a delay circuit 48 where an additional delay of from 0 to 9 microseconds may be added by means of an additional switch S-401. This delay circuit 48 may suitably be comprised of standard distributed constant delay lines, or a one shot delay multivibrator in one microsecond steps.

The shaft of each of the switches S-401—S-405, carries a circular dial 61—65 marked to indicate the count then being taken by its respective counter. The appropriate number on the face of each of dials 61—65 appears in the respective panel window 66—70 with the setting of its switch.

Our loran receiver is operated in the following manner: First, the panel knob 11 is set to the frequency of the stations known to be operating in the geographic area.

Second, the coarse and fine PRR switches are positioned so as to duplicate by means of selected connections to the counters, the pulse repetition rate of the particular pair of stations, the time difference in the receipt of the signals from which it is desired to measure. As a part of this operation, it may be necessary to adjust the drift control knob 20 thereby altering the frequency of the 100 kc. crystal oscillator slightly so as to stop the drift.

Figure 9:
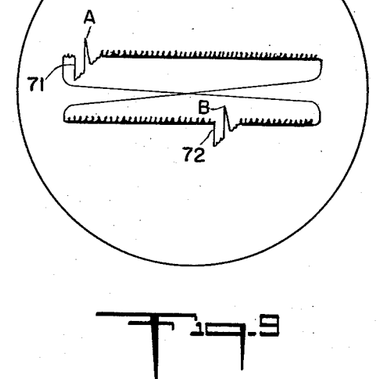
Figures 9, 10 and 11 show how the cathode ray tube presentation might appear in three positions of the function switch of our receiver.

Third, the left-right lever 20a is appropriately moved to place the master (or A) pulses on the left side of the upper trace within the notch 71 (Fig. 9), created by the fast sweep generator V-303A.

Fourth, the delay selector switches S-403, S-404, S-405, are then adjusted to move notch 72, created by triggering the fast sweep generator in coincidence with the start of the lower sweep trace, under the slave (or B) pulse appearing on the lower trace, so as to place such notch relative to the B pulse in substantially the same position as notch 71 appears relative to the A pulse.

These four steps are all accomplished with function switch knob 14 (and hence S-301), in position No. one. In this position, the slow sweep generator V-303B, a cathode follower circuit (Fig. 6), is normally conducting. The reset timer pulse from V-410 (Fig. 4), cuts off the V-303B so that the cathode voltage falls in accordance with R-326 and C-315 time constants. The slow sweep, therefore, starts in synchronism with the timing unit recycle. The output of the slow sweep V-303B is fed into the sweep push-pull amplifier V-304 in position No. one of the function switch S-301 and the amplifier output is then passed to the horizontal deflecting plate of the CRT7. The horizontal sweep amplifier V-304 is preferably of the self-balancing push-pull type with a comomn cathode resistor. It is directly coupled to the deflector plates of the CRT7, and horizontal centering is accomplished by changing the D. C. grid bias on one half of the push-pull amplifier.

When the A and B pulses are thus located and disposed on the upper and lower traces, the next steps are directed to more accurately determining the time delay.

Figure 1:
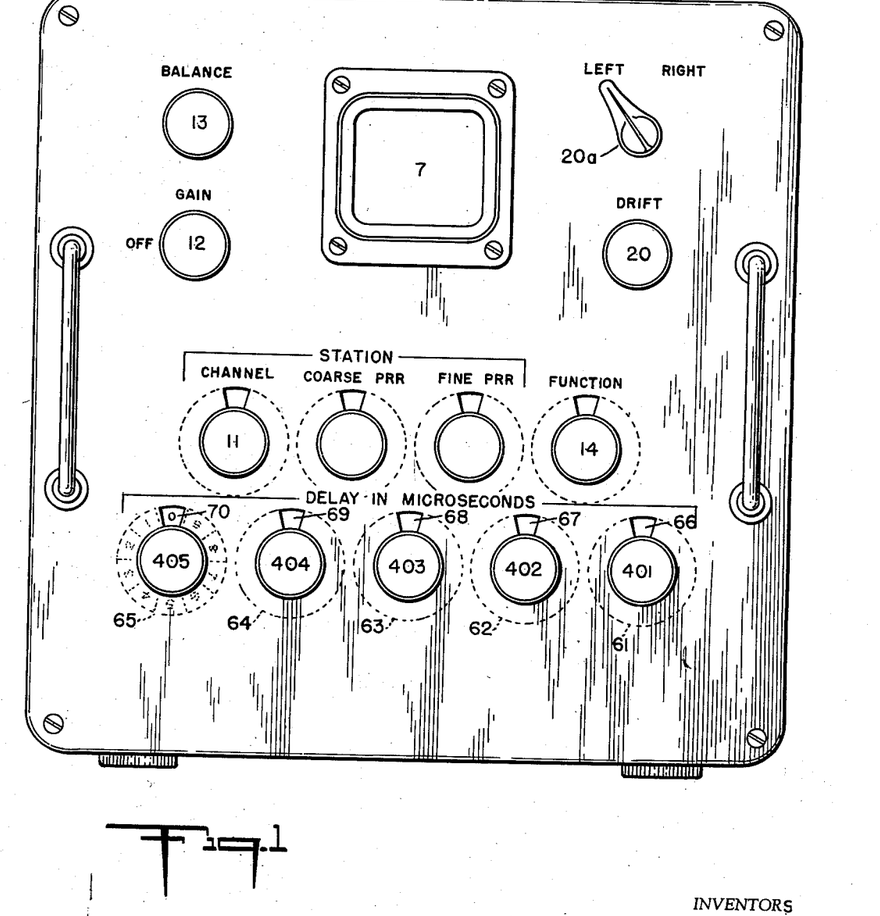
Figure 1 is a front view of the preferred embodiment of our loran receiver showing the oscilloscope, controls and time designator numerals.
Figure 10:
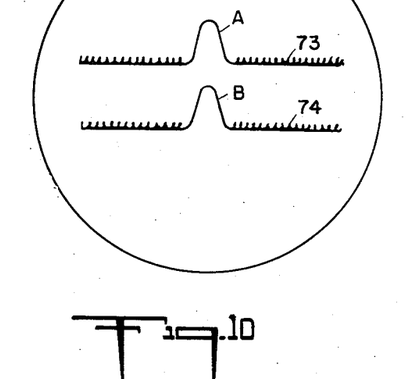

Fifth, function switch panel knob 14 (controlling switch S-301) is next shifted to position No. two, the effect of which is to disconnect the output of the slow sweep generator V-303B from the horizontal plates of the cathode ray tube 7. Simultaneously, the output of the fast sweep generator V-303A is disconnected from the vertical plates, and is switched over to the horizontal deflection plates of the CRT7. In this position, the delayed timing unit pulse from V-411B and the pulse from V-301, as a result of recycling, are both fed into the two halves of V-302 having common load resistor R-310. Both halves of V-302 are biased at cut-off by returning the cathodes to B+. Therefore, a negative pulse is obtained from the plate circuit of V-302 at the instant of recycle and again at the particular time delay set into the delay switches S-401—S-405. This delay is fed into the fast sweep generator V-303A which operates in a manner similar to the slow sweep generator V-303B, but at a faster rate of approximately 500 microseconds. In this position of function switch S-301, the fast sweep V-303A is triggered twice; once, at the counter recycle, and again at the delay set into the timer. The cathode ray tube presentation now consists of two parallel sweeps 73, 74 (Fig. 10) of approximately 500 microseconds duration. The upper sweep 73 is deflected by the A pulse as shown at A in Fig. 10; while the lower sweep 74 is modified by the B pulse, also as shown in that figure. The counter selector switches S-403, S-402 and S-401, are adjusted to bring the B pulse deflection as directly under the A pulse deflection as possible, and the amplitude of the deflections is made substantially equal by adjusting the differential gain 8, controlled by the balance knob 13 (Fig. 1).

Figure 11:
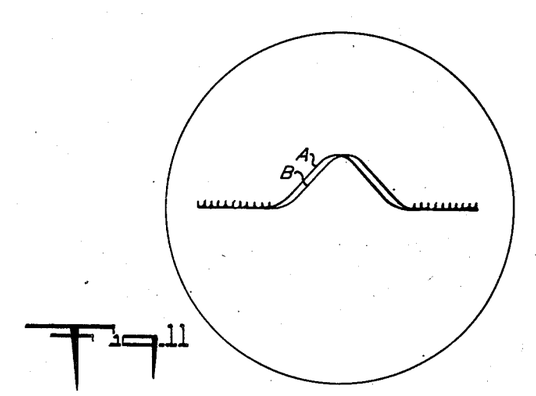

Sixth, function switch knob 14 (and hence switch S-301), are then thrown into position No. three. This causes the fast sweep circuit V-303A, to generate pulses in the same manner as the medium sweep pulses are produced in position No. two of switch S-301, but the pulse duration is cut to two hundred microseconds by reducing the time constant in the cathode circuit of V-303A (see Figs. 6 and 7). Also, the output of the dual sweep binary V-301 is removed from the vertical plates of CRT7 with the result that two deflected fast sweep traces are now superimposed for exact alignment of the two pulses (Fig. 11). Such exact alignment will normally be obtainable by making a one or two position change in selector switch S-402 and by hunting for the exact further time difference by turning the nine microsecond delay switch S-401 to a position which results in perfect superimposition of one trace on the other. The clocking mechanism has now duplicated the delay between the receipt of the master and slave pulses, and this delay can be read directly from the windows 66—70 above the selector switch dials. To enable a direct reading to be thus taken, the right hand dial is arranged to indicate the setting of delay line switch S-401 in units from 0-9. The dial next to the left, indicates the setting of S-402 (tens of microseconds); the third dial S-403 (hundreds of microseconds); the fourth dial, S-404 thousands of microseconds), and fifth and last dial, which has only two numerals 0 and 1, the setting of the dial position switch S-504 (to indicate whether the time difference lies between 9,999 and 19,999 microseconds). This is sufficient since present loran systems do not contemplate measurements greater than several thousands of microseconds.

While our novel counter arrangement employing the MO-10 type tubes in the manner hereinabove described, is specifically directed to making time measurements in a loran receiver, it will be obvious to those skilled in the art that our arrangement could be readily adapted to make time (and hence distance), measurements in other types of apparatus such as radar. The counters also may be employed for computing machines and other devices in which rapid pulsing is a feature.

Although in the preferred embodiment of our apparatus we have employed, as stated above, Burroughs MO-10 beam switching tubes as counters, it appears from current literature (see Tele-Tech and Electronic Industries, June 1954, page 94 et seq.), that similar tubes, to which the generic term "trochotrons" has been given, have been developed and experimented with in Sweden. Such "trochotrons" appear to have characteristics similar to the Burroughs MO-10's and should be capable of serving as counters in apparatus such as we have described. We intend to comprehend such "trochotrons" within the designation of "multi-target beam switching tube" as employed in the claims.

We claim:

1. An electronic frequency subdividing arrangement, said arrangement comprising a source of pulses of a predetermined frequency, a multi-target beam switching tube, said tube having a centrally located cathode, a plurality of spade elements disposed radially apart from and about said cathode, a plurality of target elements, each target element being associated with and disposed radially beyond one of said spade elements, a plurality of control grids, said grids also being disposed radially about said cathode and in association with said spade and target elements, all said elements being contained in a common glass envelope, and having a cylindrical permanent magnet disposed in predetermined relation to said elements, a resistor in series with each spade element, means to energize said tube to cause it to assume an indexing beam condition, means connecting the control grids of said tube to the said source to receive pulses therefrom at a predetermined frequency, said pulses acting to cause the grids to take control and to move said beam step-by-step around said cathode, passing current momentarily to each target element indexed, whereby each last said target element receives current flow once with each rotation of the electron beam about the cathode of said tube, the output of said arrangement being taken from a selected target element.

2. The frequency subdivider arrangement as described in claim 1, wherein selector switch means are provided to connect selected ones of the several target elements of the tube, the output of the arrangement being taken from said switch thereby to enable the subdivision of the predetermined pulse frequency to be varied.

3. In a loran receiver adapted to determine the difference in microseconds between the time of receipt of master and slave pulses from a pair of transmitting stations, a timing arrangement, said arrangement comprising oscillator means, said means being adapted to generate pulses at a predetermined frequency, a first counter stage, said stage including a multi-target beam switching tube, said tube having a centrally located cathode, a plurality of spade elements disposed radially apart from and about said cathode, a plurality of target elements, each target element being associated with and disposed radially beyond one of said spade elements, a plurality of control grids, said grids also being disposed radially about said cathode and in association with said spade and target elements, all said elements being contained in a common glass envelope, and having a cylindrical permanent magnet disposed in predetermined relation to said elements, and a resistor in series with each spade element, means to energize said tube to cause it to assume an indexing beam condition, means connecting the control grids of said tube to the output of the oscillator to receive pulses therefrom at a predetermined frequency, said pulses acting to cause the grids to move said beam step-by-step around said cathode, passing current momentarily to each target element indexed whereby each last said element receives current flow once with each rotation of the electron beam about the cathode of said beam, second and third counter stages, each including a similar multi-target beam switching tube, series resistors and energizing means, the control grids of the tubes of the second and third stages being connected to one of the target elements of the tube of the preceding stage, two multi-vibrator stages following the third stage, a coincidence circuit, switching means, said switching means being adapted to connect selectively one of the several target elements of each said tube and the multi-vibrator stages into the coincidence circuit, thereby to adjust the pulse rate of the coinciding outputs of the several stages to match the pulse repetition rate of the said stations.

4. The timing arrangement as described in claim 3, wherein in lieu of the said connection between a target element of one said multi-target tube and the control grid of the tube of the following stage, a blocking oscillator is provided, each said blocking oscillator having a cathode, grid and plate, and the grid of each said blocking oscillator being connected to the last target element of the tube of the preceding stage, the plate circuit of said blocking oscillator being connected to the control grids of the next multi-target tube, thereby to sharpen the pulse arriving at the said last target element before applying it to the control grids of the next succeeding stage.

5. In a loran receiver adapted to determine the difference in microseconds between the time of receipt of master and slave pulses from a pair of transmitting stations, a timing and rate repetition selector arrangement, said arrangement comprising a source of pulses at a predetermined frequency, a multi-target beam switching tube, said tube having a centrally located cathode, a plurality of spade elements disposed radially apart from and about said cathode, a plurality of target elements each said target element being associated with and disposed radially beyond one of said spade elements, a plurality of control grids, said grids also being disposed radially about said cathode and in association with said spade and target elements, all said elements being contained in a common glass envelope, and a cylindrical permanent magnet disposed in predetermined relation to said elements, and a resistor in series with each spade element, means to energize said tube so as to cause it to assume an indexing beam condition, the control grids of said tube being connected to the said source to receive pulses therefrom at a predetermined frequency, said pulses acting to cause said beam to move step-by-step around said cathode to pass current momentarily to each target element indexed, whereby each last said element receives current flow once with each rotation of the electron beam about the cathode of said tube, a second and third counter stages, each including a similar multi-target beam switching tube, series resistors and energizing means, the control grid of the tubes of the second and third stages being connected to one of the target elements of the tube of the preceding stage, two multi-vibrator stages following the third stage, a first coincidence circuit, first switching means, said switching means being adapted to connect selectively the several target elements of each said multi-target beam tube and the multi-vibrator stages into the first coincidence circuit, thereby to adjust the pulse rate of the coinciding output of the several stages to match the pulse repetition rate of the said stations, recycling means, said means being adapted to deliver simultaneously two negative pulses of short duration, of similar wave shape but of different amplitudes, the pulse of greater duration being delivered to one spade of each multi-target beam tube, and the pulse of lesser duration being delivered to the remaining spades, said recycling means being triggered at the rate of maximum pulse amplitude coincidence, thereby to clear each said multi-target beam tube and to zero it for further counting before the next similar pulse coincidence.

6. The arrangement as described in claim 5 wherein sweep circuits are provided, and the output of the recycling means is also employed to trigger said sweep circuits with each recycling of the multi-target beam tubes and the multi-vibrator tubes.

7. The arrangement as described in claim 6 wherein there is further provided a second pulse coincidence circuit, a second series of switching means, one last said means for each of the multi-target beam tubes, said second series of switching means including a position for connecting each target element of the multi-target beam tube, into the second coincidence circuit, and means to shift the second switching means into any of their said positions, visible indicator means on said shifting means, whereby the count of each multi-target tube inserted into the second coincidence circuit by the second switching means may be visually observed directly from the said indicator means.

8. An electronic arrangement adapted to count pulses from a source thereof, said arrangement comprising a multi-target beam switching tube, said tube having a centrally located cathode, a plurality of spade elements disposed radially apart from and about said cathode, a plurality of target elements, each target element being associated with and disposed radially beyond one of said spade elements, a plurality of control grids, said grids also being disposed radially about said cathode and in association with said spade and target elements, all said elements being contained in a common glass envelope, and having a cylindrical permanent magnet disposed in predetermined relation to said elements, and a resistor in series with each spade element, means to energize said tube to cause it to assume an indexing beam condition, means connecting the control grids of said tube to the pulse source, said pulses acting to cause said beam to move step-by-step around said cathode to pass current momentarily to each target element, recycling means, said recycling means being adapted to deliver simultaneously two negative pulses of short duration, of similar wave shape, but of different amplitudes, the pulses of greater duration being delivered to one spade of the said tube, and the pulse of lesser duration being delivered to the remaining spades, means to trigger said recycling means at preselected intervals, whereby said tube is cleared and zeroed with each triggering of the recycling means to permit recounting by the tube of pulses from the source thereof, and switching means, said switching means being adapted to connect selectively the several target elements of said tube to vary the count effected by said tube within the interval between each recycling.

9. In a loran receiver adapted to determine the difference in microseconds between the time of receipt of master and slave pulses from a pair of transmitting stations, a timing arrangement, said arrangement comprising oscillator means, said means being adapted to generate pulses at a predetermined frequency, a plurality of counter stages, each stage including a multi-target beam switching tube, said tube having a centrally located cathode, a plurality of spade elements disposed radially apart from and about said cathode, a plurality of target elements, each target element being associated with and disposed radially beyond one of said spade elements, a plurality of control grids, said grids also being disposed radially about said cathode and in association with said spade and target elements, all said elements being contained in a common glass envelope, and having a cylindrical permanent magnet disposed in predetermined relation to said elements, and a resistor in series with each spade element, means to energize each said tube to cause it to assume an indexing beam condition, means connecting the control grids of each said tube to the output of the oscillator to receive pulses therefrom at the oscillator frequency, said pulses serving to cause the grids to move said beam step-by-step around said cathode, passing current momentarily to each target element indexed, whereby each last said element receives current flow once with each rotation of the electron beam about the cathode, a coincidence circuit, switching means, said switching means being adapted to connect selectively any one of the several target elements of said tube into the coincidence circuit, thereby to adjust the pulse rate of the coinciding outputs to match the station repetition rate.

References Cited in the file of this patent
UNITED STATES PATENTS 2,551,681    Lawrence ______________ May 8, 1951

OTHER REFERENCES

"Tele-Tech and Electronic Industries," June 1954, pp. 94 to 96 and 166.